(No Model.)

H. J. DIGGLES.
CART.

No. 363,991. Patented May 31, 1887.

WITNESSES:
Donn Twitchell
C. Sedgwick

INVENTOR:
H. J. Diggles,
BY Munn & Co.
ATTORNEYS.

UNITED STATES PATENT OFFICE.

HENRY J. DIGGLES, OF FORT JONES, CALIFORNIA.

CART.

SPECIFICATION forming part of Letters Patent No. 363,991, dated May 31, 1887.

Application filed February 2, 1887. Serial No. 226,281. (No model.)

*To all whom it may concern:*

Be it known that I, HENRY J. DIGGLES, of Fort Jones, in the county of Siskiyou and State of California, have invented a new and Improved Cart, of which the following is a full, clear, and exact description.

This invention relates to a novel form of cart, wherein the cart-body-supporting frame is suspended beneath the axles of the wheels, the cart-body being directly mounted upon longitudinal springs that are upheld by the said supporting-frame, a novel arrangement for connecting the shafts being also employed, all as will be hereinafter more fully explained, and specifically pointed out in the claims.

Reference is to be had to the accompanying drawings, forming a part of this specification, in which similar figures of reference indicate corresponding parts in both the views.

Figure 1:
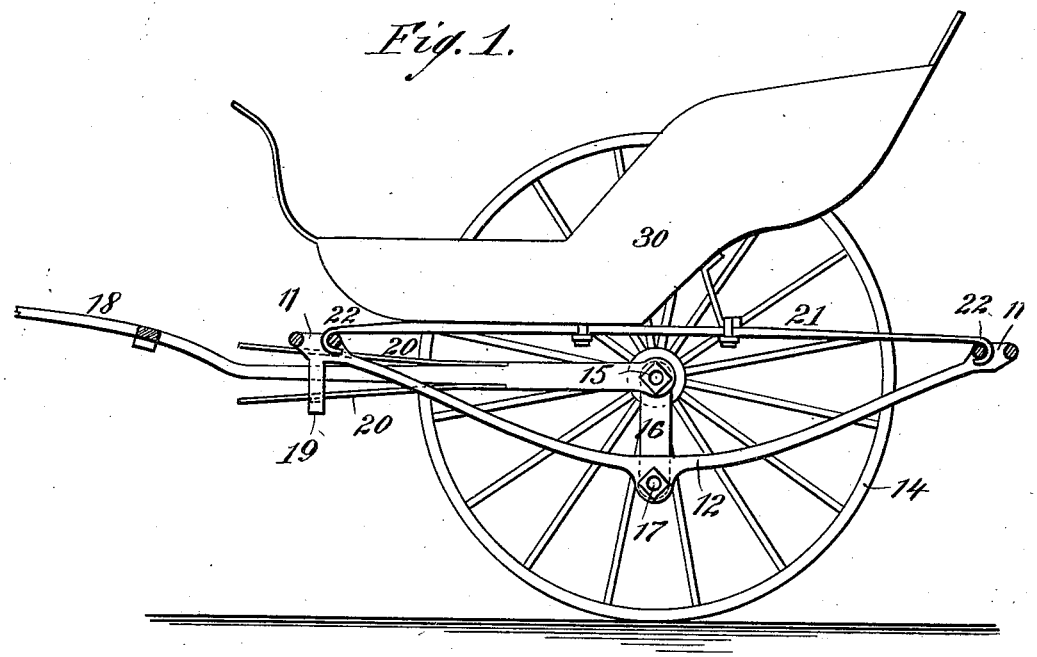
Figure 2:
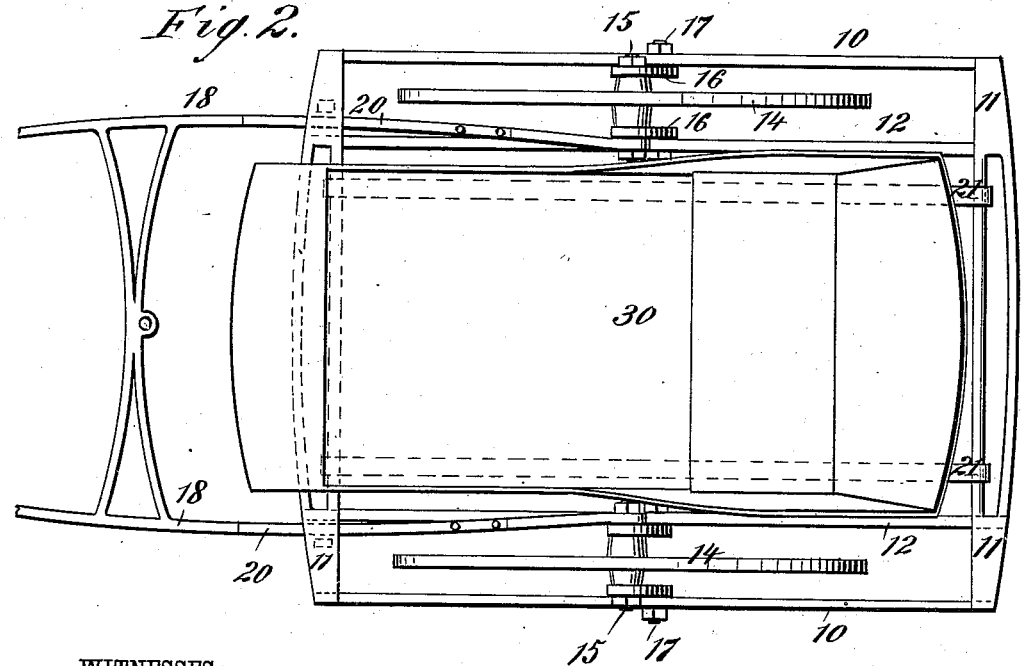

Figure 1 is a side view of a cart-body arranged in accordance with the terms of my invention, the main supporting-frame being shown in central longitudinal section; and Fig. 2 is a plan view of the cart.

In constructing such a cart as the one illustrated in the drawings above referred to, I provide a main frame made up of outward downwardly-curved side strips, 10, that are secured to double forward and rear cross-strips, 11, inner longitudinally and downwardly bent strips, 12, being arranged as clearly shown in Fig. 2.

The wheels 14 are mounted between each pair of strips 10 and 12, and in connection with the hubs of each of these wheels there is arranged a short shaft, 15, upon which there are mounted links 16, to the lower ends of which links the side bars, 10 and 12, are connected by bolts 17.

The rear ends of the thills 18 are formed with eyes, through which the short shafts 15 pass, and from the shafts 15 the thills extend forward through loops 19, that project downward from the under side of the forward cross-bar, 11, springs 20 being connected above and below to the thills to the rear of the loops 19, and arranged so as to extend forward through said loops, these springs being arranged to hold the thills in about the position in which they are shown in Fig. 1.

The cart-body 30 is mounted upon longitudinal springs 21, the ends of which are hooked, as shown at 22, which hooks are arranged to engage with the inner lengths of the double cross bars 11; but I do not limit myself to the manner of attaching the ends of the springs.

With such a cart as has been described, the cart-body will adjust itself to about a horizontal plane irrespective of the contour of the ground over which the cart is passing; and as the weight of the cart is suspended from, instead of being arranged above, the hubs of the wheels, it will be seen that the overturning of the cart is almost impossible.

By mounting the body-supporting frame as illustrated and described severe jolting or jarring of the occupant of the cart is avoided, as the cart body and frame will swing easily upon the wheel-connections in case an obstruction is encountered in the road. The frame of the cart may be made of metal or wood, as may be desired.

In practice it will be found that a considerable saving of material is effected by reason of the peculiar construction described. The same principle is applicable for use in the construction of four-wheeled vehicles, the forward frame being, as usual, mounted to swivel upon a king-pin.

Having thus fully described my invention, I claim as new and desire to secure by Letters Patent—

1. The combination, with a supporting-frame, of wheels, shafts arranged in connection with the wheel-hubs, and links connected to said shafts and to the supporting-frame, substantially as described.

2. The combination, with wheels, of shafts arranged in connection therewith, supporting-links carried by the shafts, a frame supported by the links, and a cart-body provided with longitudinal springs that are connected to the frame, substantially as described.

3. The combination, with wheels, of shafts arranged in connection with their hubs, links connected to the shafts, a frame made up of longitudinal downwardly-curved bars 10, other longitudinal and downwardly-curved bars, 12, double cross-strips 11, thills 18, connected to the wheel-shafts, loops 19, through which the thills pass, springs 20, arranged in connection with the thills, a cart-body, 30, and longitudinal springs 21, upon which the cart-body is supported, said springs being formed with hooked ends 22, that engage with the inner lengths of the double cross-strips 11, substantially as described.

HENRY J. DIGGLES.

Witnesses:
A. B. CARLOCK,
M. C. BEEM.